United States Patent
Lo et al.

[11] Patent Number: 5,999,603
[45] Date of Patent: Dec. 7, 1999

[54] METHOD AND APPARATUS FOR PROVIDING MULTI-NETWORK VIRTUAL SERVICES

[75] Inventors: Ron Lo, Holmdel; Om Prakash Mahajan, Ocean; Christos I. Vaios, Shrewsbury; Eldred James Visser, Annandale, all of N.J.

[73] Assignee: AT&T Corp, New York, N.Y.

[21] Appl. No.: 08/844,425

[22] Filed: Apr. 18, 1997

[51] Int. Cl.$^6$ .................................................. H04M 15/00
[52] U.S. Cl. .......................... 379/127; 379/219; 379/220
[58] Field of Search .................................... 379/127, 207, 379/220, 112, 113, 229, 114, 201, 221, 67.1, 219

[56] References Cited

U.S. PATENT DOCUMENTS

| | | | |
|---|---|---|---|
| 5,311,572 | 5/1994 | Friedes et al. | 379/67 |
| 5,333,185 | 7/1994 | Burke et al. | 379/127 |
| 5,481,603 | 1/1996 | Gutierrez et al. | 379/221 |
| 5,506,894 | 4/1996 | Billings et al. | 379/127 |
| 5,515,425 | 5/1996 | Penzias et al. | 379/114 |
| 5,517,564 | 5/1996 | Slater et al. | 379/229 |
| 5,519,770 | 5/1996 | Stein | 379/201 |
| 5,553,130 | 9/1996 | Turner | 379/220 |
| 5,757,894 | 5/1998 | Kay et al. | 379/127 |

*Primary Examiner*—Scott Wolinsky
*Assistant Examiner*—Bing Bui

[57] ABSTRACT

In the case of an outbound international call originating from the U.S., an international communication system at a first switch receives, over a segment of the communication channel, the calling party's automatic number identification (ANI) and the dialed number (DN). The switch then sends a query to a processor having a previously stored customer processing records (CPRs). The database at the processor correlates the call information with the appropriate CPR; a service identity value is then inserted into a field which is unused for domestic calls. Call information including the service identity value is then transmitted to a second switch. When the service identity value indicates a service has been triggered, the transmitted call information is correlated with the appropriate index in a trigger table. The service-related values associated with the matched pseudo-country code are then inserted into the service-specific parameters. Finally, the service-specific values are delivered to the called party in the destination country using the service-specific parameters. A similar process is performed for an inbound international call originating from a foreign country and an international transit call.

17 Claims, 2 Drawing Sheets

METHOD AND APPARATUS FOR PROVIDING MULTI-NETWORK VIRTUAL SERVICES

CROSS-REFERENCE TO A RELATED PATENT APPLICATION

This patent application is related to a commonly assigned U.S. patent application entitled METHOD AND SYSTEM FOR IMPLEMENTING INTELLIGENT TELECOMMUNICATION SERVICES UTILIZING SELF-SUSTAINING, FAULT-TOLERANT OBJECT ORIENTED ARCHITECTURE, Ser. No. 08/844,424 (Attorney Docket Lo 2-5-4-2), Apr. 18, 1997, by the same inventors.

FIELD OF THE INVENTION

The present invention relates to a system for processing information relating to international communication services. More specifically, this invention relates to communicating international calls through a multi-carrier global virtual network.

BACKGROUND

The Global Virtual Network Service (GVNS) is a multi-network international service proposed by the International Telecommunications Union (ITU). GVNS allows service providers to offer subscribing customers a service with features and functionality similar to that of a private network without requiring the customers to purchase and manage the networks. GVNS provides these private network functions to users at geographically dispersed international locations while minimizing the need for dedicated network resources. The GVNS service will utilize an inter-connection between two respective international switching centers (ISCs) using the Public Switched Telephone Network (PSTN).

The ITU has developed a series of standards to define the GVNS, including GVNS Configuration 2 (C2) and GVNS Configuration 3 (C3). These series of standards reflect increasingly complex versions of the service.

The existing GVNS C2 configuration has several limitations. For example, the existing GVNS C2 configuration can utilize only the so-called Called Party Number (CdPN) to carry limited GVNS service-related information. The number of digits available for end-users, network applications and specific service applications is restricted to the length of the CdPN. Thus, the originating carrier information cannot be efficiently obtained by the CdPN alone.

Furthermore, the GVNS C2 configuration cannot be used to provide transit service directly. Transit service routes calls originating in one foreign country to a destination in another foreign country while passing through a third country service provider. Using the GVNS C2 configuration, indirect addressing at the switch located in the intermediate third country is needed to interpret the call destination.

GVNS C3 will overcome many of the limitations associated with GVNS C2 by transporting GVNS-specific parameters in International Consultative Committee for Telegraphy and Telephony (CCITT) #7 ISUP protocol, an international common-channel signaling standard. In addition to passing expanded routing information, GVNS C3 will also pass additional information in the GVNS C3 parameters, including service-specific information. Implementation of the GVNS C3 service, however, presents several difficulties. Although GVNS C3 parameters are compatible with CCITT #7 ISUP protocol, they are not compatible with the Common Channel Signaling System 7 (CCS7) ISUP protocol, a North American common-channel signaling standard. Thus, an international call to, from or through North America must be translated from GVNS C3 parameters in CCITT #7 ISUP protocol to CCS7 ISUP protocol, or vice versa.

Translating CCITT#7 ISUP protocol to or from CCS7 ISUP protocol should be performed in a cost effective and efficient manner. In the case of an outbound international call from a North American origin, populating the GVNS C3 parameters at the location from where each call originates is not the most cost effective or efficient approach. Cost effectiveness and efficiency also discourages transporting the GVNS C3 parameters from the call originating location, through the CCS7 network, and to the foreign network destination. Similarly, in the case of a call inbound from a foreign location, cost effectiveness and efficiency discourage transporting the GVNS C3 parameters from the edge of the CCS7 network, through the CCS7 network, to the call destination.

Thus, interoperability problems will exist between the carriers that implement the GVNS C3 service and those carriers that refrain from implementing GVNS C3 and continue to use GVNS C2.

SUMMARY OF INVENTION

The present invention allows some carriers to continue using GVNS C2 throughout their network by relying on those carriers that implement GVNS C3 to provide interoperability. The present invention thereby allows a carrier the flexibility to introduce the GVNS C3 service to only a small number of switches thereby minimizing corresponding development costs.

The present invention solves the above problems associated with passing service-specific parameters in CCITT #7 ISUP protocol through segments of a communication channel that are not compatible with CCITT #7 ISUP protocol.

The present invention also distinguishes and translates, at specific points in the CCS7 network to ensure cost effectiveness and efficiency, an international call transmitted over a communication channel between the caller in an originating country and the called party in a destination country.

In the case of an outbound international call originating from the U.S., the present invention at a first switch receives, over a segment of the communication channel, the call information from the calling party. The call information may include the automatic number identification (ANI) and the dialed number (DN).

The switch then sends a query to a processor having a database comprising previously stored customer processing records (CPRs). The database at the processor correlates the call information with the appropriate CPR; a service identity value is then inserted into a field which is unused for domestic calls. Call information including the service identity value is then transmitted to a second switch.

When the service identity value indicates a service has been selected, the transmitted call information is correlated with the pseudo-country codes, or an appropriate index which identifies the foreign network, in a trigger table. The service-related values associated with the matched index are then inserted into the service-specific parameters. The service-specific values are delivered to the called party in the destination country using the service-specific parameters.

In other words, when a service has been selected, the call information and routing information are modified based on the service identity value and the index. The index triggers self-executing objects having network specific instructions, user specific instructions and communication resource specific instructions. When objects are triggered, a first group of instructions are extracted. The first group of instructions are correlated with previously stored data. The previously stored data are processed based on the first group of instructions. Finally, the routing information is delivered to the destination.

In the case of an inbound international call originating from a foreign country, the process is similar, but in reverse order. The first switch that receives the international call sends a query to a previously stored customer database containing customer processing records (CPRs). The database at the processor correlates the appropriate CPR. The service-specific parameters are removed and are used to route the call within the CCS7 network.

In the case of an international transit call, the U.S. ISC switch can analyze it and make intelligent call processing and routing decisions, e.g., eliminating unnecessary intermediate switch connections. The network-exiting switch determines whether the terminating administration (TA) requires the service-specific parameters. If it is required, the network-exiting switch transmits the service-specific parameter to the appropriate switch.

DETAILED DESCRIPTION

The following commonly known terms are discussed throughout the detailed description and are provided here in glossary form for convenience.
AMA: automatic message accounting
ANI: automatic number identification
ANM: answer message
C2: Configuration 2
C3: Configuration 3
CC: country code
CCITT: International Consultative Committee for Telegraphy and Telephony
CCS7: Common Channel Signaling System 7
CdPN: called party's number
CID: customer identification
CON: connect message
CPR: Call Processing Record
DN: dialed number
GUG: GVNS User Group
GVNS: Global Virtual Network Service
GW: gateway
IAM: initial address message
ID: identification
ISC: international switching center
ISDN: Integrated Services Digital Network
ISUP: ISDN user port
ITU: International Telecommunications Union
LEC: local exchange carrier
LOC: location extension
NCP: network control point
NDC: national destination code
OPSP: Originating Participating Service Provider
PBX: private branch exchange
PCC: pseudo-country code
PN: private number
PSTN: Public Switched Telephone Network
RN: routing number
RSI: route selection index
SI: service identity
SRI: supplemental routing information
SSS: service identification
TA: terminating administration
TCAP: transaction capabilities application part
TNRN: Terminating Network Routing Number
TTT: trunk identification
USI: user service identification
WZ1: World Zone 1

Figure 1:
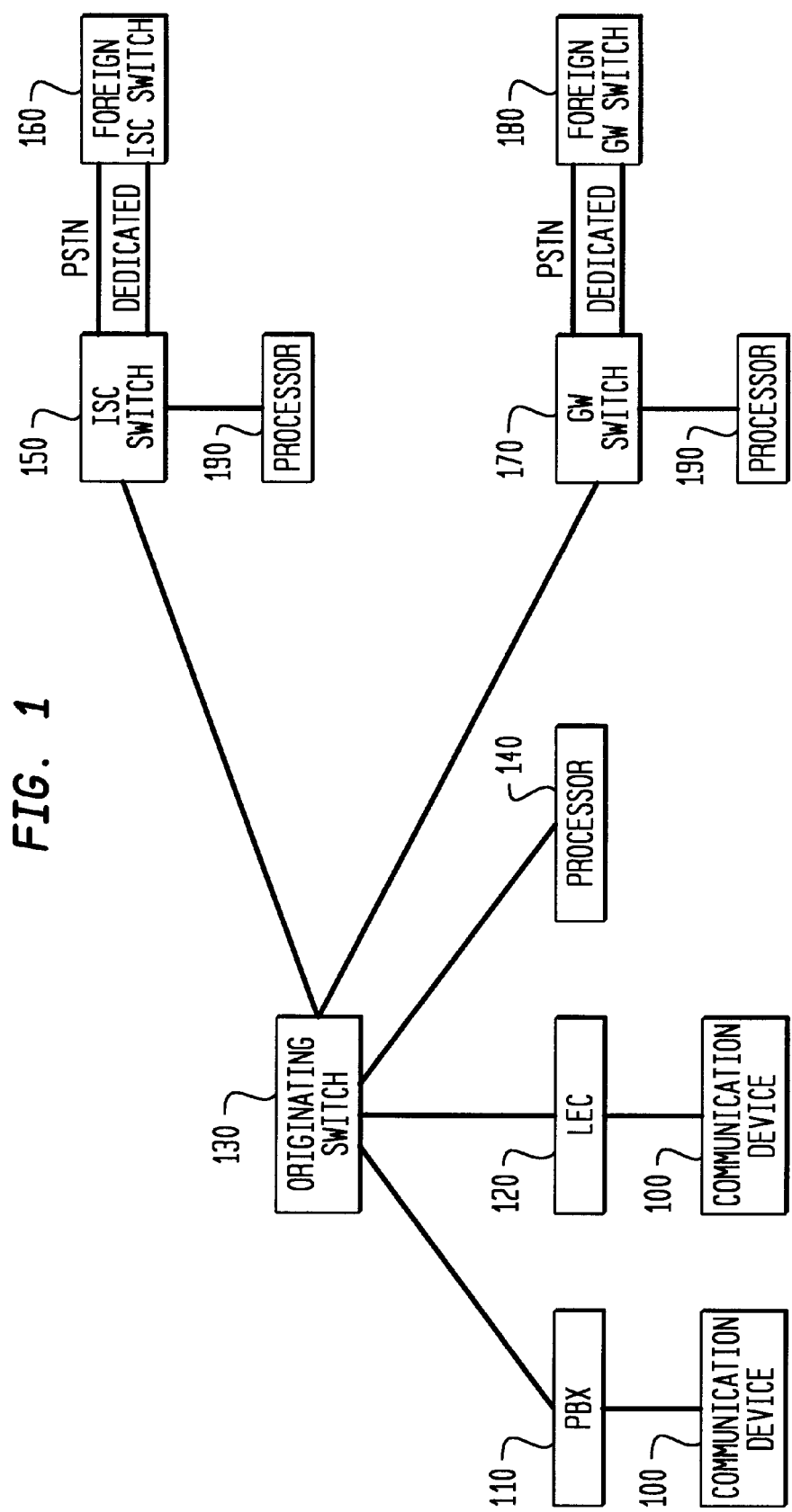
FIG. 1 illustrates a segment of an international communication system according to an embodiment of the present invention.

FIG. 1 illustrates a segment of an international communication system according to an embodiment of the present invention. The international network in FIG. 1 spans at least two countries: for example, an originating country in World Zone 1 (WZ1) which includes all the countries served by the North American Dialing Plan (such as Canada and the Caribbean nations) and a destination country outside of WZ1. The set of originating and destination countries chosen for FIG. 1 does not preclude the present invention from being applicable to different sets of originating and destination countries.

Customer communication devices 100 are connected to PBX 110 or LEC 120 which are connected to originating switch 130. Originating switch 130 may be one of a variety of types of switches including an AT&T 4ESS switch. Each participating service provider (e.g., AT&T, Sprint, MCI, Bell Atlantic, etc.) will likely operate at least one, separate originating switch 130.

Originating switch 130 will have access to processor 140 which comprise a computer system with disk storage which receives routing data from the signaling network. Processor 140 runs standard database management system software to retrieve and process call handling instructions for a specific customer based on a set of stored parameters. Collectively, these parameters are known as a Call Processing Record (CPR). Processor 140 may be implemented as a Network Control Point (NCP) which is a processor-controlled centralized data base facility performing all the functions described above. The operation of an NCP is described, for example, in the D. Sheinbein, et al., article on pp. 1737–44 of Bell System Technical Journal (BSTJ), September, 1982, Volume 61, No. 7, Part 3.

Originating switch 130 is connected to ISC switch 150 and/or GW switch 170. The manner in which a call to or from a foreign country is connected depends on whether that foreign country is within WZ1 which utilizes at least two types of switches: international switching center (ISC) switches and gateway (GW) switches. The ISC switches located in a WZ1 country are at the edge of the CCS7 network and serve as an exchange point between the CCS7 network and foreign ISC switches located in non-WZ1 countries. ISC switch 150 is connected to a foreign ISC switch 160 by PSTN/ISDN or dedicated GVNS communication facilities. Foreign ISC switch 160 is located in a non-WZ1 country and is the exchange point for inbound and outbound international calls to and from that non-WZ1 country.

The GW switches are located within the interior of the CCS7 network and can communicate with other GW switches located in WZ1 countries. GW switch 170 can be connected to a foreign GW switch 180 by PSTN/ISDN or dedicated GVNS facilities.

The components in FIG. 1 constitute the hardware and software platform on which the operational features of the invention are built. Thus, in the course of the disclosure of this invention, a high level explanation of their functionality or internal architecture is provided for the purpose of a comprehensive and thorough description of the invention. Persons skilled in the art, however, will understand that the specific embodiment in FIG. 1 can be altered in numerous ways and nevertheless be used to implement the invention.

Outbound Call to a Non-WZ1 Country

To place an outbound call to a non-WZ1 country, the customer from communication device 100 may generate an on-net or forced-net call. On-net calls include calls generated within a private network, e.g., a private branch exchange (PBX); forced-net calls include calls for which the customer believes it dialed a public number, but the call is directed as a private network call. Thus, the customer may directly connect an international call in a number of ways, e.g., dialing a seven-digit private number or a variable length international (non-WZ1) private number. The customer may also connect the call through switched access, such as through PBX 110 or LEC 120, in a number of ways, e.g., dialing 700 and a seven-digit number.

The generated call signaling information, including the automatic number identification (ANI) and the dialed number (DN), is then transmitted to originating switch 130. Originating switch 130 translates the dialed digits and sends a CCS7 TCAP query to processor 140 where the customer's Call Processing Record (CPR) resides. The query forwards the ANI and DN to processor 140 to determine the appropriate CPR. When the DN matches a record in the appropriate CPR and a GVNS C3 on-net indication is present in the appropriate CPR, a supplemental routing information (SRI) parameter is triggered and an international routing number (RN) is determined. The RN provides the necessary routing information for the originating switch 130 to route the call. An international RN includes the called party's pseudo-country code (PCC), customer identification (CID) and seven-digit private number (PN). If a match is found and a GVNS C3 on-net indication is not present in the CPR, or a match is not found in the CPR, then the existing GVNS C2 call handling procedures apply. Table 1 illustrates examples of possible results of the above process.

TABLE 1

| DN | RN | On-Net Indicator | Off-net Indicator | SRI |
|---|---|---|---|---|
| CC + CID + PN | PCC + CID + PN | on | off | GVNS C3 on |
| 7 digits | CC + CID + PN | off | on | GVNS C3 off |

After processor 140 messages back the SRI and RN to originating switch 130, originating switch 130 creates an automatic message accounting (AMA) record for the call, formulates a CCS7 ISUP initial address message (IAM) and routes the call signaling information to the appropriate ISC switch 150. To formulate a CCS7 ISUP IAM, a number of CCS7 ISUP parameters must be set. The CCS7 ISUP CdPN parameter is set based on the RN passed from processor 140. The CCS7 ISUP IAM selection identification (SI) is set for GVNS C3-outbound. The route selection index (RSI) value is set for GVNS C3-outbound to distinguish this call from a GVNS C2 call and to identify the next routing instruction/table.

ISC switch 150 receives the call signaling information transmitted from originating switch 130 and converts the format of the signaling information from CCS7 ISUP parameters, the format in which the call was received by ISC switch 150, to CCITT #7 ISUP Forward GVNS parameter, the ITU standard format in which the call must be transmitted to the foreign ISC switch 160. In the case where the SI value is set for GVNS C3-outbound, ISC switch 150 examines a trigger table located at ISC switch 150. The trigger table contains the additional information required to populate the CCITT #7 ISUP Forward GVNS parameters.

The trigger table could be of any form and include the following information: PCC, CC, SSS, TTT, CID, LOC, NDC, Filler, and OPSP. Table 2 illustrates a possible trigger table arrangement with entries relevant for an outbound call to a non-WZ1 country.

TABLE 2

| PCC | CC | SSS | TTT | CID | LOC | NDC | Filler | OPSP |
|---|---|---|---|---|---|---|---|---|
| XXX | XX | | | | | XXX-XXX | FFFF | 1-456-28X |

The values from the trigger table for the SSS, TTT, CID, and LOC parameters are utilized in the case of an outbound call to a WZ1 country, and therefore will be discussed below in the next section. The Filler value is an extra parameter with which to route calls. If the PCC contained within the CdPN matches a PCC in the trigger table, ISC switch 150 builds the signaling information required to populate the CCITT#7 ISUP Forward GVNS parameters from the table entries that correspond to the matched PCC.

ISC switch 150 inserts a hard-coded, service provider-unique, seven-digit number in the form of the CC and NDC into the OPSP field of the Forward GVNS parameter. Because the OPSP is uniquely assigned for each GVNS service provider, the OPSP can be hard coded by each GVNS service provider at ISC switch 150. ISC switch 150 inserts the pseudo-country code (PCC), customer identification (CID) and private number (PN) from the called party's number (CdPN) into the GUG field of the Forward GVNS parameter. ISC switch 150 also inserts the PN from the called party's number into the TNRN field of the Forward GVNS parameter. Thus, the Forward GVNS parameter is constructed with the necessary information.

ISC switch 150 also inserts the NDC from the trigger table into the CCITT #7 ISUP CdPN parameter, and sets an optional parameter USI to indicate whether the call is a speech or data transmission. ISC switch 150 then passes the CdPN parameter to foreign ISC 160, in additional to the Forward GVNS parameter. Table 3 summarizes the outgoing CCITT #7 ISUP IAM message.

TABLE 3

| CCITT #7 ISUP Parameter | Contents |
|---|---|
| CdPN | NDC |
| USI | Speech or Data |
| Forward GVNS | OPSP |
| | GUG |
| | TNRN |

After the foreign ISC switch 160 has received all of the CCITT #7 ISUP signaling message sequences, it sends an answer message (ANM) or connect message (CON) back to ISC switch 150 indicating that the call is considered complete. As required for GVNS C3, the ANM or CON message will also include the far-end network dependent information as part of the Backward GVNS parameter.

Outbound Call to a WZ1 Country

To place an outbound call to a WZ1 country, a customer can generate an international call from communication device 100 through either PBX 110 or LEC 120. The call is transmitted to originating switch 130 which processes the call and passes it to processor 140.

In the case of an outbound call to a WZ1 country where processor 140 identifies a GVNS C3 call, the SRI and SI parameters are set for GVNS C3-outbound and a "national" routing number (RN) is determined. The RN is a "national" routing number because even though the call's origination and destination are in different countries, both are in WZ1 countries (e.g., a U.S. originating call with a Canadian destination). A "national" RN includes the called party's service identification (SSS), trunk identification (TTT), and location extension (LOC). Processor 140 then messages back the RN to originating switch 130. Originating switch 130 creates an AMA record and formulates a CCS7 ISUP IAM. Originating switch 130 then routes the call to gateway (GW) switch 170.

GW switch 170 receives the call signaling information transmitted from originating switch 130 and converts the format of the signaling information from CCS7 ISUP parameters to CCITT #7 ISUP Forward GVNS parameters. In the case where the SI value is set for GVNS C3-outbound, GW switch 170 examines the trigger table located at GW switch 170, as discussed above. Table 4 illustrates a possible trigger table arrangement for an outbound call with entries relevant for an outbound call to a to a WZ1 country.

TABLE 4

| PCC | CC | SSS | TTT | CID | LOC | NDC | Filler | OPSP |
|---|---|---|---|---|---|---|---|---|
|  | 1 | 0XX | XXX | XXX | XXX | XXX-XXX | FFFF | 1-456-28X |

If the SSS contained within the CdPN matches a SSS in the trigger table, GW switch 170 builds the signaling information required to populate the CCITT #7 ISUP Forward GVNS parameters from the table entries that correspond to the matched SSS. GW switch 170 inserts the hard-coded, service provider-unique seven-digit OPSP from the trigger table into the OPSP field of the Forward GVNS parameter, inserts the CID from the trigger table into the GUG field of the Forward GVNS parameter, and inserts the LOC from the trigger table and the last four digits of the CCS7 ISUP CdPN (corresponding to the called party's extension) into the TNRN field of the Forward GVNS parameter. Thus, the Forward GVNS parameter is constructed with the necessary information.

GW switch 170 also inserts the NDC, or CC and NDC from the trigger table into the CCITT #7 ISUP CdPN parameter. GW switch 170 then passes the CdPN to foreign GW switch 180, in addition to the Forward GVNS parameter.

After the foreign GW switch 180 has received all of the CCITT #7 ISUP signaling message sequences, it send a ANM or CON message back to GW switch 170 indicating that the call is considered complete. The ANM or CON message will also include the far-end network dependent information as part of the Backward GVNS parameter.

Inbound Call

To receive an inbound call from a non-WZ1 country, ISC switch 150 receives the CCITT #7 ISUP IAM from foreign ISC switch 160. To receive an inbound call from a WZ1 country, GW switch 170 receives the CCS7 ISUP IAM from foreign GW switch 180. Because ISC switch 150 and GW switch 170 process an inbound call similarly, the following discussion regarding inbound calls will be discussed in terms of the ISC switch 150, but will also apply to GW switch 170.

ISC switch 150 processes the CCITT #7 ISUP CdPN to identify the appropriate service provider for the inbound call. ISC switch 150 then constructs an ANI where the first three digits specify the call as a GVNS C3 call, the next three digits are inserted from the GUG of the Forward GVNS parameter, and the last four digits (ACCC) remain unchanged to identify the IAM message originating administration and country. ISC switch 150 also extracts the CID from the CCITT #7 ISUP CdPN. ISC switch 150 then sends to processor 190 a CCS7 TCAP Begin message which includes the DN, the newly created ANI and the CID. Table 5 illustrates the information included in the CCS7 TCAP Begin message.

TABLE 5

| Parameter | Content |
|---|---|
| CID | 888-000-XXXX |
| ANI | 198-GUG-ACCC |
| DN | GUG + TNRN |
| Supplemental Orig. Info (SOI) | 1 (inbound call) |

At processor 190, the GUG is deleted from the DN based on the SOI of 1 and ANI with the first three digits of "198". The remaining segment of the DN is compared to the entries in the CPR. If a match is not found, then the customer has not purchased the foreign-to-foreign country calling service and the call is blocked. If a match is found, a routing number (RN) is obtained from the CPR along with an on-net private or off-net public indication and the necessary routing information. Processor 190 formulates a CCS7 TCAP End message based on this information and sends the End message to ISC switch 150.

ISC switch 150 receives the TCAP message, translates the call and routes the call to originating switch 130. Originating switch 130 receives the CCS7 ISUP IAM and translates the call. Table 6 illustrates the information included in the outgoing message.

TABLE 6

| Parameter | Content |
|---|---|
| CdPN | SSS-TTT-XXXX for private on-net call, or NPA-NXX-XXX for public off-net call |
| SI | GVNS C3 inbound |
| USI | Speech or data |

For a public off-net call, the first three digits (NPA) of the CdPN represents the North American Numbering Plan Administrator and the next three digits represent the specific service provider. If the GVNS C3 call cannot be entirely delivered as such, the SI can be changed to indicate the call has become a GVNS C2 call. Originating switch 130 then completes the call to PBX 110 or LEC 120. ISC switch 150 then sends the Backward GVNS parameter in the ANM or CON message.

Transit Call—Foreign Country to Foreign Country Call

Transit calls originate from one foreign country and terminate in another foreign country while passing through a U.S. located ISC switch. Upon receiving an incoming GVNS C3 transit call, the U.S. ISC switch can analyze it and make intelligent call processing and routing decisions, e.g., eliminating unnecessary intermediate switch connections. Because the network transition from GVNS C2 to GVNS C3 will not be instantaneous, compatibility between the two standards will be important.

Under GVNS C3, if the originating country, the terminating country, or both are WZ1 countries, then the transit call is processed differently than if both the originating and terminating countries are non-WZ1 countries. An example of a non-WZ1 country to non-WZ1 country transit call is a call that originates from France, passes through a U.S. ISC switch, and terminates in Peru. An example of WZ1 country to non-WZ1 country transit call is a call that originates from Canada, passes through a U.S. ISC switch, and terminates in France.

Figure 2:
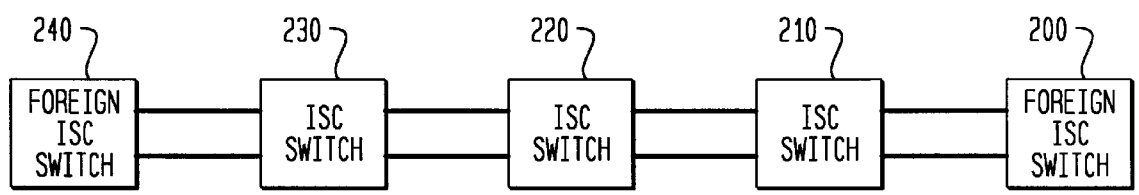
FIG. 2 illustrates a segment of an international communication system involved with a non-WZ1 country to non-WZ1 country international transit call, according to an embodiment of the present invention.

FIG. 2 illustrates a segment of an international communication system involved with a non-WZ1 country to non-WZ1 country transit call (i.e., foreign to foreign transit call), according to an embodiment of the present invention. ISC switch 210 receives a transit call including a CCITT #7 ISUP IAM from foreign ISC switch 200 by PSTN/ISDN or dedicated GVNS facilities. The CCITT #7 ISUP IAM includes the CdPN, Forward GVNS parameters and USI. ISC switch 210 can recognize a GVNS C3 call based on the CCITT #7 ISUP CdPN parameter. If the call is a GVNS C3 call that must be routed to intermediate switches, such as ISC switch 220, before exiting the CCS7 network, ISC switch 210 formulates an outgoing CCS7 ISUP IAM message based on the trigger table before routing the call to the next switch. Once the call has reached a network-exiting switch, e.g., ISC switch 230, the switch determines whether the terminating administration (TA) requires the Forward GVNS C3 parameter based on the CC, NDC and SI. If the Forward GVNS C3 parameter is not required by the TA, ISC switch 150 populates the CCITT #7 ISUP IAM parameters based on existing GVNS C2 methods. If the Forward GVNS C3 parameter is required by the TA, ISC switch 150 then properly populates the CCITT #7 ISUP IAM parameters as discussed above. ISC switch 230 inserts CC and NDC into the CdPN parameter of the CCITT #7 ISUP IAM to indicate that the call is a transit call.

The system and process for handling a GVNS C3 transit call from a foreign WZ1 country to a foreign WZ1 or to a non-WZ1 country, or from a foreign non-WZ1 country to a foreign WZ1 country is essentially the same as just above described with one exception. A call to or from a foreign WZ1 country passes through GW switches, rather than through ISC switches.

In summary, the present invention solves the problems associated with passing service-specific parameters in CCITT #7 ISUP protocol through segments of an international communication system that are not compatible with CCITT #7 ISUP protocol. Call processing and routing capabilities of international services are expanded to offer new services to end-users. The present invention allows the interpretation of new and embedded user and network objects to improve the processing and routing of telephone calls. Finally, the present invention improves the efficiency and cost effectiveness of call processing and routing.

What is claimed is:

1. A method of communicating an international call, over a channel within a communication system, said method comprising the steps of:

(a) receiving, over the channel, routing information associated with a destination and with the international call;
   (b) correlating at least one of call information and routing information with a service identity value;
   (c) modifying the call information and the routing information based on the service identity value and an index that triggers a plurality of objects with network specific instructions, user specific instructions and communication resource specific instructions; and
   (d) when the plurality of objects has been triggered, performing the following substeps:
      (i) extracting a first group of instructions from the plurality of objects;
      (ii) correlating the first group of instructions with previously stored data;
      (iii) processing the correlated previously-stored data based on the first group of instructions; and
      (iv) delivering the modified routing information to the destination.

2. The method of claim 1, wherein:
   the call information is the calling party's automatic number identification (ANI) for an outbound international domestic-based call; and
   the routing number is based on the dialed number (DN) for an outbound international domestic-based call.

3. The method of claim 1, wherein said correlating step (b) for an outbound international domestic-based call is performed by a processor.

4. The method of claim 3, wherein the processor is an external database.

5. The method of claim 1, wherein said correlating step (d)(ii) for an outbound or inbound call is performed by a processor.

6. The method of claim 5, wherein the processor is an external database.

7. The method of claim 1, wherein the service identity value of correlating step (b) is contained in a look-up trigger table.

8. The method of claim 1, wherein the previously stored information of correlating step (d)(ii) is contained in a look-up trigger table.

9. The method of claim 1, wherein the index of step (d) is a pseudo-country code.

10. The method of claim 1, wherein the index of step (d) is a country code.

11. A apparatus for communicating an international call, over a channel within a communication system, comprising:
   means for receiving, over the channel, routing information associated with a destination and with the international call;
   means for correlating call information or routing information with a service identity value;
   means for modifying the call information and the routing information based on the service identity value and an index that contains a plurality of objects with network specific instructions, user specific instructions and communication resource specific instructions;
   means for extracting a first group of instructions from the plurality of objects;
   means for correlating the first group of instructions with previously stored data;
   means for processing the correlated previously-stored data based on the first group of instructions; and
   means for delivering the modified routing information to the destination.

12. The apparatus of claim 11, wherein:
   said means for modifying call information and routing information is located at an originating switch.

13. A method of communicating an international call, over a channel within a communication system, said method comprising the steps of:
   (a) modifying at least one from the group of call information and routing information based on a service identity value, the modified call information and routing information including an index that triggers at least one self-executing object having instructions; and (b) when the at least one self-executing object has been triggered, performing the following substeps:
(i) extracting a first group of instructions from the plurality of self-executing objects; and
(ii) processing previously-stored data based on the first group of instructions.

14. The method of claim 13, wherein:

the call information is the calling party's automatic number identification (ANI) for an outbound international call; and the routing number is based on the dialed number (DN) for an outbound international call.

15. The method of claim 13, wherein the previously-stored information is contained in a look-up trigger table.

16. The method of claim 13, wherein said modifying step (a) is performed at a originating switch.

17. The method of claim 13, wherein:

said modifying step (a) is performed at a originating switch, said extracting step (b)(i) and said processing step (b)(ii) are performed at a destination switch.

* * * * *